United States Patent [19]

Floyd

[11] Patent Number: 4,736,542
[45] Date of Patent: Apr. 12, 1988

[54] SCENTED FISHING LURE

[76] Inventor: John F. Floyd, 402 Hillcrest Offices, Spartanburg, S.C. 29302

[21] Appl. No.: 920,671

[22] Filed: Oct. 16, 1986

[51] Int. Cl.⁴ .......................................... A01K 85/00
[52] U.S. Cl. ................................................ 43/42.06
[58] Field of Search ................ 43/42.06, 42.09, 42.36, 43/41, 44.99

[56] References Cited

U.S. PATENT DOCUMENTS

| | | | |
|---|---|---|---|
| 1,854,027 | 4/1932 | Gruenhagen | 43/42.06 |
| 2,129,245 | 9/1938 | Stenstrom | 43/46 |
| 2,216,929 | 10/1940 | Zander | 43/42.24 |
| 2,745,206 | 5/1956 | Gaw | 43/42.48 |
| 2,826,853 | 3/1958 | Guy | 43/42.06 |
| 2,854,779 | 10/1958 | Jackson | 43/37 |
| 3,108,389 | 10/1963 | McGuire | 43/42.06 |
| 3,514,358 | 5/1970 | Monaghan et al. | 156/306 |
| 3,740,889 | 6/1973 | Scott | 43/42.09 |
| 3,867,781 | 2/1975 | Wolfe | 43/42.09 |
| 3,914,895 | 10/1975 | Mize | 43/42.4 |
| 3,942,281 | 3/1976 | Hill | 43/42.39 |
| 3,953,934 | 5/1976 | Visser | 43/42.06 |
| 4,074,455 | 2/1978 | Williams | 43/42.34 |
| 4,530,179 | 7/1985 | Larew | 43/42.06 |
| 4,589,223 | 5/1986 | Hastings | 43/42.53 |

Primary Examiner—Gene P. Crosby
Attorney, Agent, or Firm—Dority & Manning

[57] ABSTRACT

A scented fishing lure having a rigid absorbent body portion constructed from fibrous material. The body portion is constructed with resin-impregnated fiberous material. Because the entire body portion is of an absorbent nature, the body portion can absorb and be thoroughly saturated with a fish attractant oil. The fish attractant oil is released into the water at a constant, prolonged rate during use of the present scented fishing lure to provide a fish attracting odor for facilitating the catching of fish.

19 Claims, 1 Drawing Sheet

SCENTED FISHING LURE

BACKGROUND OF THE INVENTION

The present invention relates to a fibrous fishing lure having absorbed therein a fish attracting substance.

A wide variety of fishing lures have been developed for attracting a fish to a hook. In addition to the use of fishing lures themselves, it has been found advantageous to use scented substances which are known to have fish-attractant properties. Such substances include oils and extracts which provide an odor in the water which attracts fish to the fishing area.

In using such fish attractants, a recurring problem has been the delivery of the fish attractants underwater to the area where the fish are. One method has been to pour or spread the fish attractant on the surface of the water in the form of an oil. Because the oil remains on or near the surface of the water and does not necessarily follow the lure, the providing of fish attractant on the surface of the water is often ineffective.

In an alternate method, the fish attractant can be applied directly to the exterior of the lure. However, once the lure contacts the water, the fish attractant is usually quickly dispersed, thereby necessitating frequent reapplication of the fish attractant to the lure. Because the fish attractant must be frequently reapplied to the lure, prolonged use of the lure in the water is not possible. Similarly, a sponge-like lure or part thereof could be filled with fish attractant, but frequent reapplication of the fish attractant would still be required, making prolonged use of the lure difficult.

Various lures have been devised which are incorporated with fish attractant substances. For example, U.S. Pat. No. 4,530,179, granted to Larew for a "Salt Impregnated Fishing Lure" discloses a plastic molded fishing lure having incorporated throughout a sufficient quantity of salt to give the lure a salty taste, thereby making the lure attractive to fish. However, the molding of the fish attractant directly in such a lure does not necessarily assure a constant, uniform rate of entry of the attractant into the water around the lure to provide continuous attraction of fish to the adjacent hooks. U.S. Pat. No. 3,953,934, granted to Visser for a "Odoriferous Fishing Device" discloses a fishing lure having a rigid, sintered metal body including a network of interconnected pores filled with a fish attractant. The attractant is released into the water from the pores to attract fish to the hook. A disadvantage with such a lure is that filling the pores with the fish attractant is relatively difficult. This is because the lure itself is not absorbent, and the fish attractant must be forced into the lure by some means, such as by placing the lure in a container of fish attractant and then pulling a vacuum on the container.

SUMMARY OF THE INVENTION

It is an object of the present invention to provide a fishing lure which delivers fish attractant into water at a generally constant, prolonged rate during use to provide a fish attracting odor for facilitating the catching of fish.

Another object of the present invention is to provide a fishing lure which may be used repeatedly without significantly reducing the effectiveness of the delivery of fish attractant into the water.

Another object of the present invention is to provide a fishing lure which may be easily impregnated initially or re-impregnated with fish attractant.

Still another object of the present invention is to provide a fishing lure which may be readily constructed and shaped to a wide variety of weights and configurations to accommodate different fishing environments and the attraction of different fish.

Yet another object of the present invention is to provide a fishing lure which is of simple and relatively inexpensive construction.

Generally, the present invention includes an improved fishing lure comprising a body portion of a predetermined shape and at least one fish hook associated with the body portion, the body portion being constructed of rigid resin-impregnated fibrous material, the fibrous material being capable of absorbing an oil-based fish attractant substance so that when the fish attractant substance is absorbed by the body portion and the lure is drawn through water, the fish attractant will become gradually displaced from the body portion over an extended period of time to attract fish in the surrounding water to the lure.

More specifically, the fishing lure of the present invention preferably includes a generally cylindrical or frusto-conical shaped body portion constructed of a resin-impregnated felt material. The felt material is preferably comprised of wool and/or synthetic polymeric fibers. The resin impregnated felt material is capable of absorbing a fish attractant substance, typically an oil-based liquid. A longitudinally extending passageway is defined in the body portion and is in communication with the fish attractant and resin-impregnated felt material. The passageway extends through the body portion from the forward end to the rearward end of the body portion and allows water to pass through the body portion, thereby facilitating the exposure of the fish attractant from the felt material to the water. Streamers are attached to the body portion to further enhance the fish attractive aspects of the present fishing lure. At least one hook is provided aft the body portion, among the streamers, for catching a fish.

BRIEF DESCRIPTION OF THE DRAWINGS

The foregoing as well as other objects of the present invention will be more apparent from the following detailed description of the preferred embodiment of the invention, when taken together with the accompanying drawings, in which.

DESCRIPTION OF THE PREFERRED EMBODIMENT

Figure 1:
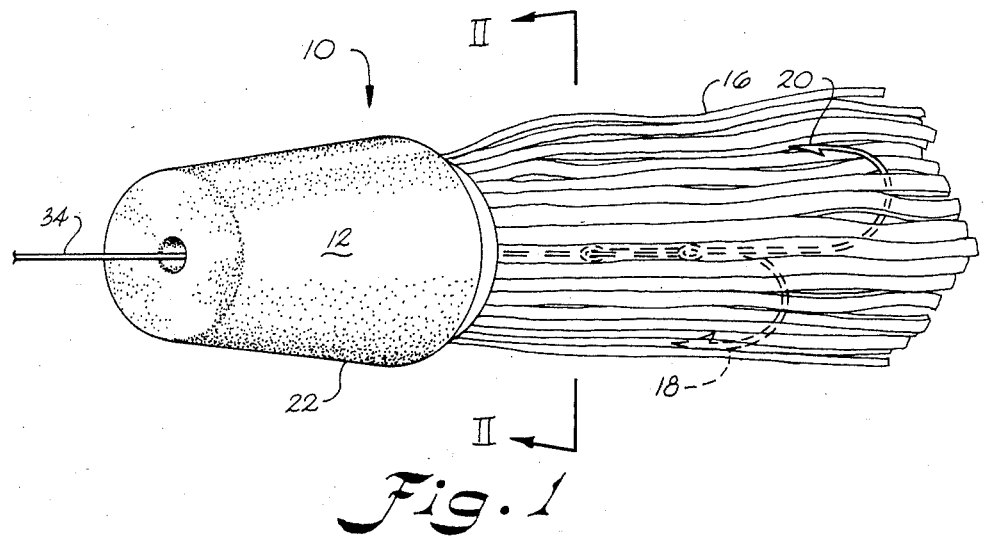
FIG. 1 is a perspective view of a preferred form of a fishing lure constructed in accordance with the present invention.

Referring to the drawings in detail, wherein like reference characters represent like elements throughout the views, the fishing lure of the present invention is designated generally by the reference character 10. As shown in FIG. 1, fishing lure 10 includes a body portion 12 having a central passageway 14 defined therein, streamers 16 attached to body portion 12, and fishing hooks 18, 20 attached to body portion 12 among streamers 16.

Body portion 12 is relatively hard and rigid and is constructed from a resin-impregnated fibrous material such as felt. The felt can be made of natural fibers, such as wool, and/or synthetic polymeric fibers, particularly acrylics and polyesters. In fact, the synthetic polymeric fibers generally possess an affinity for oils while being hydrophobic. Such further enhances the ability of the lure body to retain the oily attractant. The felt can be made up of nonwoven and/or woven fibers. Because the fibers of wool felt typically lock together due to the natural tendency of wool fibers to engagingly tangle with one another, felt material may be created without weaving. Woven felt can also be used to construct body portion 12. Woven felt is created using conventional weaving techniques. Man-made fibers such as the synthetic polymerics can also be combined together with natural fiber such as wool, to form a suitable felt material.

Body portion 12 is made rigid by the impregnation of the felt material with a resin such as urethane. In forming body portion 12, the felt material is combined with a suitable resin to form a mass of a predetermined shape. The resin-felt mass is thus subjected to heat of a predetermined temperature and pressure adequate to cure the resin and cause rigidification of the mass. After hardening, the mass of resin-impregnated felt material may be shaped by machining until the desired form of fishing lure is achieved. It is also to be noted that the mass of resin-impregnated felt could be molded to shape and cured in the molded form of the fishing lure desired, thereby eliminating the subsequent machine-shaping step. Typical resins for impregnation of the felt are thermoset resins such as urethanes. Because body portion 12 is rigid, it is very durable and can withstand rugged, repeated usage.

There are several advantages to forming body portion 12 of fishing lure 10 from a fibrous or felt material. The felt material has the capability of readily absorbing and retaining liquids due to the capillary action characteristic of the fibers, through which the fibers draw liquid into themselves, and/or due to the oleophilicity of the fibrous material. Such capabilities of the fibrous or felt material permit thorough infiltration of body portion 12 with an attractant liquid by merely soaking body portion 12 directly in the attractant liquid or by applying the attractant liquid by some other means to the exterior surface 22 of body portion 12. Because of the absorbent qualities of the felt material, body portion 12 may become thoroughly saturated with a liquid, aromatic fish attractant, typically an oil, and will retain the oil for an extended period of time. The thorough absorption of a fish attractant by body portion 12 allows for a large amount of fish attractant to be supplied fishing lure 10. Also, because of the manner in which the felt material retains the fish attractant by capillary action, the dispersal of the fish attractant from body portion 12 into the surrounding water during fishing is relatively constant and prolonged.

Use of a fibrous or felt material to construct body portion 12 further provides exterior surface 22 of body portion 12 with a roughened texture, particularly when body 12 is machined to the desired shape. The roughened texture of exterior surface 22 effectuates the formation of air bubbles thereon as the fishing lure 10 is drawn through the water, which provides yet further attraction to fish in addition to the fish attractant being dispersed by body portion 12. Fishattracting qualities of fishing lure 10 are thus further enhanced.

Body portion 12 is preferably of a frusto-conical or cylindrical shape. Such shapes make fishing lure 10 well suited for fishing for game fish such as marlin, King Mackerel and the like. However, body portion 12 is not limited to a frusto-conical or cylindrical shape and could be any of a wide variety of shapes, depending, for example, on the particular environment in which fishing lure 10 is to be used, the type of fish being fished for, or the fisherman's preference.

A longitudinally extending passageway 14 is defined in body portion 12 and extends therethrough from a reduced diameter forward end 26 to an enlarged diameter rearward end 14 of body portion 12. Passageway 14 is in communication with the fibrous or felt material of body portion 12 and thereby allows fish attractant absorbed in body portion 12 to be dispersed therethrough during use of fishing lure 10. Water entering passageway 14 through the forward end 26 of body portion 12 forces fish attractant from the fibrous or felt material through rearward end 28 of body portion 12. Passageway 14 includes a reduced diameter portion 15 and an enlarged diameter portion 17. Enlarged diameter portion 17 allows for greater surface area contact of the water with the felt material, thereby enhancing fish attractant dispersal. Thus, during the use of fishing lure 10, fish attractant is delivered to the water both from exterior surface 22 and passageway 14 of body portion 12.

Figure 2:
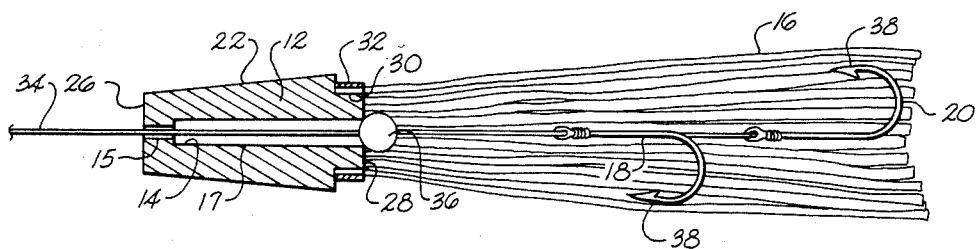
FIG. 2 is a partial cross sectional view of the lure of FIG. 1, taken along a line II—II.

Longitudinally extending streamers 16 are fixed to body portion 12 by attachment to a circumferentially extending shoulder 30 of body portion 12 by glue, tape 32, or any other suitable means. Although FIGS. 1 and 2 illustrate streamers 16 as trailing behind body portion 12, it is to be understood that streamers 16 could be attached to body portion 12 in a variety of other configurations. Streamers 16 are preferably of at least two different colors to enhance the attractiveness of fishing lure 10 to fish. Fibrous or felt material, plastic, rubber, or any other suitable materials can be used to construct streamers 16. Streamers 16 can also be produced from a felt material and thus be capable of absorbing fish attractant substances to yet further enhance the fisherman's chances of success.

Fishing hooks 18, 20 are included with fishing lure 10 and are preferably positioned adjacent rearward end 28 of body portion 12. Fishing line 34 extends through passageway 14 of body portion 12 from hooks 18, 20 to a conventional rod and reel assembly (not shown). A sink or bead 36 is attached to fishing line or leader 34 adjacent the opening of passageway 14 at rearward end 28 of body portion 12 and serves to both space fishing hooks 18, 20 behind body portion 12 and prevent fishing hooks 18, 20 from entering into passageway 24. As shown in FIG. 2, fishing hook 20 is spaced aft of fishing hook 18 to enhance the fish catching ability of fishing lure 10 by providing more barbs 38 on which a fish can be caught.

Fishing lure 10 can be used repeatedly and can be re-impregnated with fish attractant substances whenever desired. Such suitable fish attracting substances include fish oils, scented oils, solvent based oils, natural oils, water soluble oils, and colored dyes.

An important characteristic, as noted above, of synthetic polymeric fibers, such as polyester fibers, which are preferably provided in the felt used to construct body portion 12, is that such fibers are oleophyllic in nature, meaning that they have an attraction for oils. The fish attractive materials are thus not received in a pore or a cavity as appears in some prior art fishing lures, but in fact are absorbed by the entire body section 12. Another characteristic of synthetic polymeric fibers is that such fibers are hydrophobic, meaning they repel water. This characteristic finds advantageous use in fishing lure 10 in that the release of a fish attractant oil from body portion 12 is moderated by the fact that water does not tend to totally displace the fish attractant oil from the synthetic polymeric fibers, as would be the case when the oil is only contained in pores of a lure body.

While a preferred embodiment of the invention has been described using specific terms, such description is for illustrative purposes only, and it is to be understood that changes and variations may be made without departing from the spirit or scope of the following claims.

What is claimed is:

1. An improved fishing lure comprising:
 a body portion of a predetermined shape and at least one fish hook associated with said body portion, said body portion being solidly constructed of rigid resin-impregnated fibrous material, said fibrous material having fibers capable of drawing liquid into themselves for absorbing an oil-based fish attractant substance so that when said fish attractant substance is absorbed by said body portion and said lure is drawn through water, the fish attractant substance will become gradually displaced from said body portion over an extended period of time to attract fish in the surrounding water to the lure.

2. A fishing lure as defined in claim 1, wherein said fibrous material is a felt material formed from natural fibers.

3. A fishing lure as defined in claim 2, wherein said natural fibers are wool.

4. A fishing lure as defined in claim 1, wherein said fibrous material is a felt material formed from synthetic fibers.

5. A fishing lure as defined in claim 4, wherein said fibers are selected from the group consisting of acrylics and polyesters.

6. A fishing lure as defined in claim 1, wherein said fibrous material is a felt material formed from a blend of natural and synthetic fibers.

7. A fishing lure as defined in claim 1, wherein said body portion defines a longitudinally extending passageway therethrough; and wherein the fishing lure further comprises a leader associated with said body portion passing through said passageway, said leader having a plurality of hooks secured thereto; and said body portion further comprising a plurality of strips of material secured around said body and extending longitudinally outwardly therefrom, thereby facilitating the exposure of said fish attractant to the water from said fibrous material.

8. A fishing lure as defined in claim 1, wherein said body portion has a roughened exterior texture to effectuate the formation of air bubbles thereon during use of said fishing lure to thereby enhance the attractiveness of said fishing lure to fish.

9. A fishing lure as defined to claim 1, wherein said resin-impregnated fibrous material of said body portion has absorbed therein a fish attractant substance.

10. An improved fishing lure comprising: a rigid body portion solidly formed in a predetermined shape from resin-impregnated fibrous material; and at least one fish hook associated with said body portion, said resin-impregnated fibrous material having fibers capable of drawing liquid into themselves for absorbing a fish attractant substance; said body portion having a forward end, a rearward end, and an exterior surface; said fish attractant substance being exposable to said exterior surface of said body portion for contact with water in which said fishing lure is to be immersed for delivery to the surrounding water at a generally constant, prolonged rate during use to provide a fish-attracting odor for facilitating the catching of fish.

11. A fishing lure as defined in claim 10, wherein said resin-impregnated fibrous material is a resin-impregnated felt material.

12. A fishing lure as defined in claim 10, wherein said fibrous material has an attraction for oils.

13. A fishing lure as defined in claim 10, wherein said body portion is frusto-conical in shape, having a reduced forward end and an enlarged rearward end.

14. A fishing lure as defined in claim 10, wherein said resin of said resin-impregnated fibrous material is a urethane.

15. A fishing lure as defined in claim 10, wherein said body portion defines a longitudinally extending passageway therein, said passageway extending through said body portion from said forward end to said rearward end for allowing the water to pass through said body portion, thereby facilitating the exposure of said fish attractant to the water from said resin-impregnated fibrous material through said rearward end of said body portion, wherein a leader is provided said body portion and passes through said passageway, and wherein a plurality of hooks are secured to said leader.

16. A scented fishing lure for immersion in water, comprising:
 a rigid body portion formed from resin-impregnated felt material;
 said resin-impregnated felt material being capable of absorbing a fish attractant substance such that said body portion may be infiltrated therewith;
 said body portion having an exterior surface; said fish attractant substance being exposed to said exterior surface of said body portion for contact with the water in which said scented fishing lure is to be immersed;
 a plurality of strips of material attached to said body portion and extending outwardly therefrom;
 said body portion having a forward end and a rearward end and a longitudinally extending passageway defined in said body portion extending through said body portion from said forward end to said rearward end, said body portion being substantially frusto-conically shaped with said forward end of said body portion being of a reduced dimension and said rearward end of said body portion being of an enlarged diameter; and
 said passageway being in communication with said resin-impregnated felt material for allowing the water to pass through said body portion and contact said resin-impregnated felt material whereby absorbed fish attractant substance will be delivered by said resin-impregnated felt material both from said exterior surface of said body portion and from said passageway of said body portion at a generally constant, prolonged rate during use to provide a fish-attracting odor for facilitating the catching of fish.

17. A scented fishing lure as defined in claim 16, further comprising a rearward fishing hook adjacent to said rearward end of said body portion and a trailing fishing hook attached aft said rearward fishing hook.

18. A scented fishing lure as defined in claim 16, wherein said plurality of streamers are of at least two different colors.

19. A scented fishing lure as defined in claim 16, wherein said resin-impregnated felt material of said body portion has absorbed therein a fish attractant substance.

* * * * *